(12) United States Patent
Weyn

(10) Patent No.: US 9,606,962 B2
(45) Date of Patent: Mar. 28, 2017

(54) METHODS AND SYSTEMS FOR ADAPTING OBJECT LOCATING

(75) Inventor: Maarten Weyn, Hove (BE)

(73) Assignee: UNIVERSITEIT ANTWERPEN, Antwerp (BE)

( * ) Notice: Subject to any disclaimer, the term of this patent is extended or adjusted under 35 U.S.C. 154(b) by 613 days.

(21) Appl. No.: 13/808,990

(22) PCT Filed: Jul. 11, 2011

(86) PCT No.: PCT/EP2011/061789
§ 371 (c)(1),
(2), (4) Date: Jan. 8, 2013

(87) PCT Pub. No.: WO2012/004420
PCT Pub. Date: Jan. 12, 2012

(65) Prior Publication Data
US 2013/0116960 A1    May 9, 2013

(30) Foreign Application Priority Data

Jul. 9, 2010  (GB) .................................. 1011578.0
Jul. 8, 2011  (BE) .................................. 2011/0433

(51) Int. Cl.
    *G06F 17/00*   (2006.01)
    *G01S 5/02*    (2010.01)
    *H04W 64/00*   (2009.01)

(52) U.S. Cl.
    CPC ............ *G06F 17/00* (2013.01); *G01S 5/0252* (2013.01); *G01S 5/0278* (2013.01); *G01S 5/0294* (2013.01); *H04W 64/00* (2013.01)

(58) Field of Classification Search
    USPC ........................................................ 702/94
    See application file for complete search history.

(56) References Cited

U.S. PATENT DOCUMENTS

2003/0008668 A1   1/2003  Perez-Breva et al.
2003/0080992 A1*  5/2003  Haines .......................... 345/734
(Continued)

FOREIGN PATENT DOCUMENTS

EP    1 542 492 A1    6/2005
WO    2008/069446 A1  6/2008
WO    2009/156126 A1  12/2009

OTHER PUBLICATIONS

Boris Kovalerchuk, Fusion and Mining Spatial Data in Cyber-Physical Space with Dynamic Logic of Phenomena, © 2009 IEEE, p. 1660-1667.*

(Continued)

*Primary Examiner* — Tung Lau
(74) *Attorney, Agent, or Firm* — Bacon & Thomas, PLLC

(57) ABSTRACT

A method and device for dynamically altering the signal-space-to-physical-space mapping database of a set of access points for use in localizing of an object, by obtaining a location profile for the object and obtaining an estimated location of an object by measuring the signal parameter induced by at least one access point and using the signal-space-to-physical-space mapping database for deriving an estimated location from the measured signal parameter, and determining whether the obtained estimated location complies with the obtained location profile for the object. If the obtained estimated location does not comply with the location profile, the mapping database is dynamically adjusted to obtain an adjusted signal-space-to-physical-space mapping database based on a difference between the measured signal parameter and the signal parameter corresponding with the signal space for the location expected based on the location profile.

18 Claims, 10 Drawing Sheets

(56) References Cited

U.S. PATENT DOCUMENTS

2004/0095276 A1   5/2004  Krumm et al.
2005/0246334 A1   11/2005 Tao et al.
2010/0106745 A1   4/2010  Cho et al.

OTHER PUBLICATIONS

Rongxing Li, Spirit rover localization and topographic mapping at the landing site of Gusev crater, Mars, Journal of Geophysical Research, vol. 111, E02506, doi:10.1029/2005JE002483, 2006, Copyright 2006 by the American Geophysical Union, p. 1-13.*
International Search Report in PCT/EP2011/061789, Oct. 7, 2011.

* cited by examiner

METHODS AND SYSTEMS FOR ADAPTING OBJECT LOCATING

FIELD OF THE INVENTION

The invention relates to the field of object localization. More particularly, the present invention relates to a method and system for dynamically adjusting the mapping of a signal space of a set of emitters used for localizing objects.

BACKGROUND OF THE INVENTION

Localization using signal receivers and or emitters, e.g. making use of an RF signal strength fingerprint for determining the localization of an object, is widely used. Typically, in order to obtain accurate results, an offline phase is performed whereby manual calibration of different points with a known location is done in order to calibrate the localization system. This calibration results in a fingerprint database storing the recorded signal strength for the points with known location. In a second phase, the database is used for comparison of a signal strength e.g. recorded by the object that is tracked with the fingerprint database.

Signal strengths are very dynamic and can be influenced for example by doors which are opened or closed, furniture that is moved, people that pass, external RF sources, environmental conditions, etc. As the actual fingerprint thus can differ with respect to the fingerprint stored in the database, this will result in inaccurate estimation of the localization of the pattern. A number of suggestions were provided for overcoming this inaccuracy.

In a first suggestion, recalibration of the whole environment is performed manually every time a modification in the RF environment has occurred. It has been found that this is feasible to cope with large alterations, e.g. when infrastructure has been changed, but not for small alterations, provided the change has been notified to the administrator of the system. A manual recalibration of the whole environment results in huge manual interaction and does not seem feasible to deal with short time fluctuations.

In another suggestion static reference measurement points are provided, allowing recalibration for example at predetermined time intervals. Using the static reference points, the signal strength is measured on different known locations and changes in the signal strength can be used to dynamically change the fingerprint database. Such a system only works provided that the static reference points are not altered in position. Furthermore, it requires the provision of static reference points which need to be powered. One example of such a recalibration system is described in U.S. Pat. No. 6,380,894, wherein geolocation errors associated with variations in parameters of the signal transport paths are effectively removed by installing one or more reference tags, whose geolocations are precisely known. Emission from the reference tags are processed and coupled to the geolocation processor and comparison allows adjusting the calibration based on these reference tags. Another example thereof is described in WO2009/072735, wherein an environment analysis tool is used and whereby explicit communication between the access point and a receiving terminal is provided.

In still another suggestion use is made of a plurality of additional sensors for measuring changing conditions such as for example when doors are opened or closed or if the humidity or temperature changes. This information can then be used for recalibrating the system. Such recalibration is limited in the number of aspects that can be taken into account for the change in fingerprint and requires providing and powering of sensors. Related thereto is recalibration by selection of a fingerprint selected from a set of fingerprints, e.g. recorded at different times during the day and thus taking into account varying signal path conditions during the day. An example of selection from a set of predefined fingerprints depending on the actual conditions is described in US2003/008668.

Recalibration using for example the above techniques may be initiated based on input of a user indicating the system that an estimated position is wrong. This requires user interaction in order to indicate to the system where the user is located.

There is still room for a more efficient recalibration of the localization system.

SUMMARY OF THE INVENTION

It is an object of embodiments of the present invention to provide good methods and systems for recalibrating localization systems as well as localization systems thus obtained.

It is an advantage of embodiments according to the present invention that manual interaction required for recalibrating the system is reduced or even avoided. It is an advantage of embodiments according to the present invention that the recalibration can be performed automatically when required, without the need for user intervention.

It is an advantage of embodiments according to the present invention that recalibration for adapting the mapping of signal space to physical space can be performed in an automatic process by using the user location profile.

It is an advantage of embodiments according to the present invention that recalibration can be performed without the need for additional components to be placed and powered in the environment where localization is to be performed. It is an advantage of embodiments according to the present invention that no reference targets are required for recalibration. It thus is an advantage of some embodiments according to the present invention that no additional hardware is required.

It is an advantage of embodiments according to the present invention that recalibration can be performed taking into account short time fluctuations as well as long time fluctuations. It is an advantage of embodiments according to the present invention that the time scale for which fluctuations need to be taken into account can be user determined.

It is an advantage of embodiments according to the present invention that all aspects of inducing an environmental change and thus a changed fingerprint can be taken into account, such as for example presence of people, changed environmental radiation fields, changed setting, etc.

It is an advantage of embodiments according to the present invention that recalibration can be performed in an automated and/or automatic way, without the need for user interaction.

The above objective is accomplished by a method and device according to the present invention.

The present invention relates to a method for dynamically altering a signal-space-to-physical-space mapping database of a set of access points for use in localizing of an object, the method comprising obtaining a location profile for the object, obtaining an estimated location of an object by measuring the signal parameter induced by at least one access point and using the signal-space-to-physical-space mapping database for deriving an estimated location from the measured signal parameter, determining whether the obtained estimated location complies with the obtained location profile for the object, and if the obtained estimated location does not comply with the location profile, dynamically adjusting the mapping database to obtain an adjusted signal-space-to-physical-space mapping database. It is an advantage of at least some embodiments of the present invention that a recalibration of a system using signal space mapping can be used for compensating for dynamic changes in the environment, without the need for user interference, i.e. in an automated and automatic way. It is an advantage of at least some embodiments of the present invention that a recalibration of a system using signal space mapping can be used for compensation for dynamic changes in the environment, without the need for external sensors to be positioned or without the need for significant amounts of hardware components. It thereby is an advantage that less power stations for powering such components need to be provided. It is an advantage of at least some embodiments of the present invention that a recalibration of a system using signal space mapping can be used for compensating for dynamic changes in the environment, whereby the recalibration configuration can deviate from pre-set recalibration configurations so that it can compensate for truly dynamic changes.

It is an advantage of embodiments according to the present invention that recalibration can result in more accurate data from all access points.

Obtaining a location profile for the object may comprise obtaining a location profile for the object based on a plurality of localization determinations of the object using the signal-space-to-physical-space mapping database. It is an advantage of some embodiments according to the present invention that a behaviour of an object can easily be derived, and that this information can be used for automatically adjusting for dynamic changes to the environment.

The method may comprise determining a new estimated location of the object using said adjusted signal-space-to-physical-space mapping database. It is an advantage of some embodiments according to the present invention that an immediate accurate signal space mapping can be used as the recalibration can be performed the moment the dynamic change occurs.

The method may comprise repeating said determining whether an obtained estimated location complies with the obtained location profile for the object, said dynamically adjusting and said determining a new estimated location being repeated until the obtained estimated location complies with the obtained location profile. It is an advantage of some embodiments according to the present invention that a predetermined threshold can be set above which recalibration can be performed.

The method furthermore may comprise, before dynamically adjusting, evaluating whether the location profile is adequate.

The location profile may be updated depending on said evaluating.

The method may comprise determining whether or not a sudden change in a signal parameter for a plurality of emitters and/or receivers occurs. It is an advantage of some embodiments according to the present invention that a sudden change in signal parameter can trigger a recalibration, resulting in a quick adjustment after a change in the environment.

The method may comprise determining whether or not the object is, within a predetermined time interval, usually located at a recent usual location different from a classic usual location based on the location profile. The usual location may be the location where the object is located most of the time. It is an advantage of embodiments according to the present invention that recalibration can be triggered to a sudden change in usual position.

Dynamically adjusting may comprise determining the adjusted signal space to physical space mapping database based on the difference between the measured signal parameter and the signal parameter corresponding with the signal space for the location expected based on the location profile. It is an advantage of some embodiments of the present invention that quick convergence to an accurate signal space to physical space mapping database can be obtained, after a dynamic change in the environment.

Dynamically adjusting the mapping to obtain an adjusted signal-space-to-physical-space mapping database may comprise determining the adjusted signal-space-to-physical-space mapping database based on unlikely positions of the object. It is an advantage of some embodiments of the present invention that unlikely results and obvious errors are automatically corrected for.

The signal-space-to-physical-space mapping database may be any of an RF fingerprint database or a database of base station locations. It is an advantage of some embodiments according to the present invention that it can be applied in the field of RF localization. It is an advantage of some embodiments according to the present invention that the method and system can be implemented in a quick and easy manner, e.g. via installation of an additional software component in the processor of the RF localization system. It is an advantage of some embodiments of the present invention that the system can easily be upgraded to a system providing automatic recalibration according to embodiments of the present invention.

The set of access points may be a selected set of access points, selected depending on their spatial configuration.

Said dynamically adjusting may be performed if the expected location does not comply with the location profile for at least a predetermined number of times.

Said dynamically adjusting may be performed if a difference between the measured signal parameter and the signal parameter corresponding with the signal space for the location expected based on the location profile is detected for at least a predetermined number of access points.

The present invention also relates to a device for dynamically altering a signal-space-to-physical-space mapping database of a set of access points for use in localizing an object, the system comprising an input means for receiving a location profile for the object and for receiving a measured signal strength induced by at least one access point, and a processor for deriving from the signal parameter an estimated location of an object using the signal-space-to-physical-space mapping database, the processor furthermore being adapted for determining whether the obtained estimated location complies with the obtained location profile for the object and for, if the obtained estimated location does not comply with the location profile, dynamically adjusting the mapping database to obtain an adjusted signal-space-to-physical-space mapping database. The adjustment may be based on a difference between the measured signal parameter and the signal parameter corresponding with the signal space for the location expected based on the location profile.

The system may be a controller for use in a system for localizing an object.

The device may be implemented as a computer program product for, when executed on a computer, performing dynamically altering the mapping of a signal space of a set of emitters and/or receivers for localizing an object.

The present invention also relates to a computer program product for, when executed on a computer, performing a method for dynamically altering the mapping of a signal space of a set of emitters and/or receivers for localizing an object according to the above described methods.

The present invention also relates to a machine readable data storage device storing the computer program product as described above and to transmission of such a computer program product over a local or wide area telecommunications network.

The present invention also relates to a method for upgrading a localization system, the method comprising installing on a processor of the localization system a computer program product as described above or installing a device as described above.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 2A illustrates an exemplary initialization process and FIG. 2B illustrates an exemplary mapping process.

Figure 1:
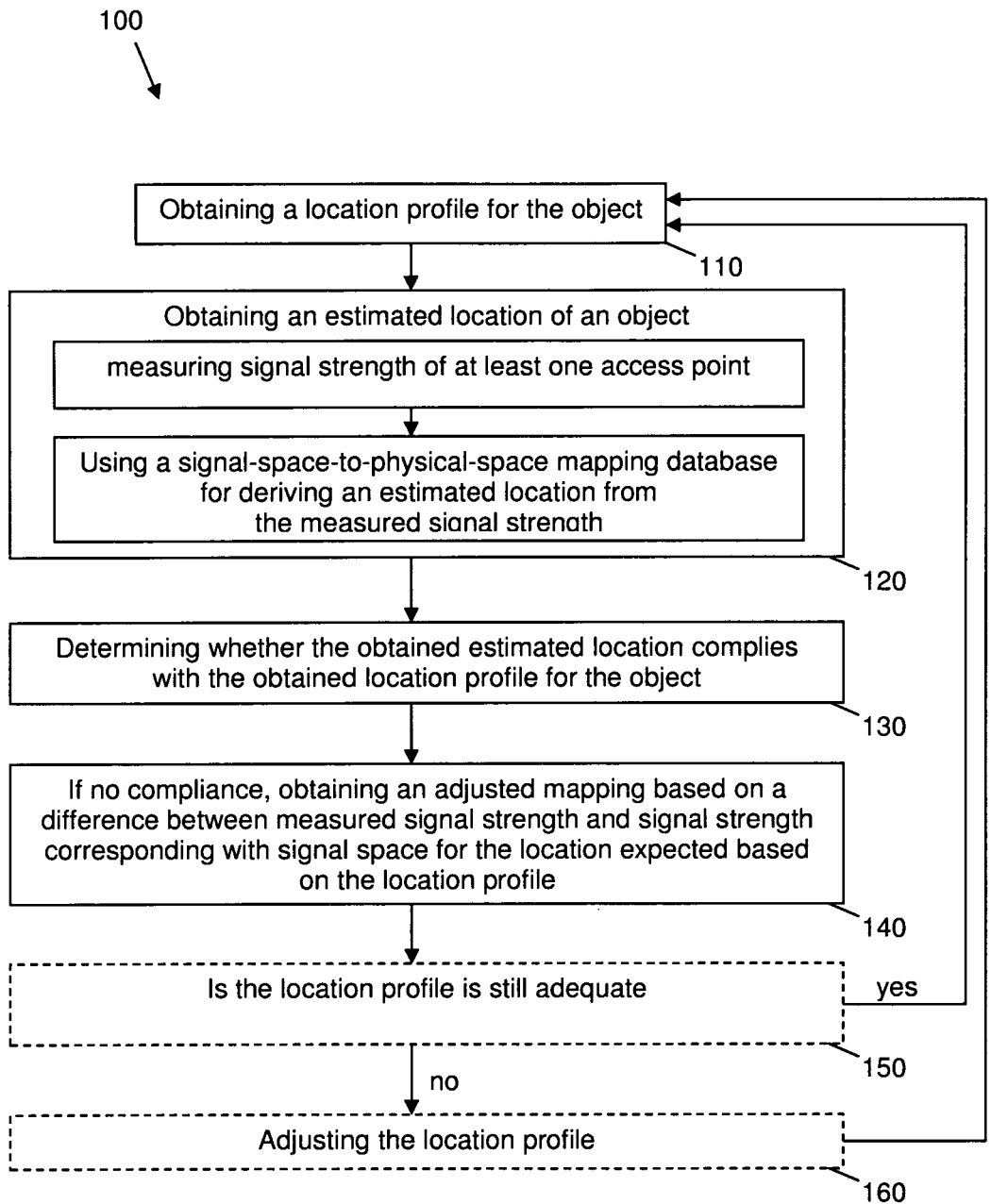
FIG. 1 illustrates a schematic overview of a method for dynamically adjusting the mapping of a signal space of a set of access points, according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

While the invention will be illustrated and described in detail in the drawings and description, such illustration and description are to be considered illustrative or exemplary and not restrictive. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The following description details certain embodiments of the invention. It will be appreciated, however, that no matter how detailed the following appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

Where in embodiments according to the present invention reference is made to an object or to an object to be tracked, reference is made to the device to be tracked or the user carrying such a device. Such an object may be a wireless asset, such as for example a receiver/emitter or a device comprising such a receiver/emitter, such as for example a mobile phone or computer or pda or tag, . . . .

Where in embodiments according to the present invention reference is made to access points, reference is made to devices emitting/transmitting/receiving electromagnetic radiation. The access points as well as the tracking principle may use different types of technology, such as for example WiFi-technology, wireless network technology, ultra wideband wireless communication, Zigbee, Bluetooth, or generally any RF technology, visual sensor techniques, sound such as ultrasonic technologies, radiation technologies such as laser or IR, etc.

Where in embodiments according to the present invention reference is made to signal space, reference is made to the mathematical space wherein for each location the signal parameter of the signals induced by the access points is given. Reference may for example be made to a mathematical space wherein for each location the signal strength of the signals emitted by or to the access points is given, or for each location the time is given required for signals to travel between the object and the access points or vice versa, or the angle from which the radiation is emitted or to which the radiation is emitted. Where in embodiments of the present invention reference is made to signal parameter, the latter may refer to signal strength, angle of radiation, signal travel time or related time difference, etc.

Where in embodiments according to the present invention reference is made to estimated location, reference is made to the location as determined based on the measurement of the signal parameter, e.g. the signal strength, the angle of the radiation emission, the time it takes for radiation to be received or related time difference and derived using the mapping database, which typically may differ from the actual location and for which one wants to correct. Where in embodiments of the present invention reference is made to "recent usual location", this may refer to the location that has been taken by the object to be tracked according to two or more recent trackings. Where in embodiments according to the present invention reference is made to "classic usual location based on the location profile", reference is made to a position that is typically taken by the object to be tracked according to the location profile.

In a first aspect, the present invention relates to a method for dynamically altering or adjusting a signal-space-to-physical-space mapping database of a set of access points for use in a method for localizing an object. The method can advantageously be used with systems wherein localization of an object is performed using a set of access points emitting signals and by evaluating a mapping of a signal-space-to-physical-space of a set of access points, e.g. fingerprinting. As indicated above, the method is not restricted to RF applications, but can be used for a plurality of applications based on different signal transport properties, such as laser or IR radiation, sound and visual sensor techniques, etc. The method according to embodiments of the present invention allows for correction of a change in the mapping of the signal space to physical space, e.g. due to change of environmental conditions, change in physical position of objects in the area of interest, etc. By way of illustration, embodiments of the present invention not being limited thereto, a method according to an embodiment of the present invention will be described with reference to FIG. 1. The method 100 according to embodiments of the present invention comprises obtaining 110 a location profile of an object. The location profile may comprise details regarding the location of the object or evolution of the location of the object over time. The location profile may for example be obtained through data mining of the data already determined with the localization system, although embodiments are not limited thereto. The location profile for the object may in one example be based on a plurality of localization determinations of the object using a signal-space-to-physical-space mapping database. The location profile also could be a user input. The location profile can include the object's location pattern as well as the objects behavior. Examples of the location profile can be found as follows: when tracking a number of devices, such as for example a laptop, pda, mobile device, tag, etc. some of these are temporary fixed, such as for example a person working with his laptop on his desk. Through data mining, one can find which behaviour a user's device has. For example, in the case of the laptop, a location profile may be that the device is on average 90% of the time at a certain place such as a desk. The location profile may reflect a statistical chance that an object is at a certain position, e.g. based on tracking over a period of time. The location profile may take into account differences in behavior at different moments in time, e.g. different behavior at different moments during the day or at different moments during the week (e.g. weekend or working days). The location profile may be quantified, e.g. by expressing it as a set of probabilities that an object to be tracked is positioned at a certain position during a given time interval. The method 100 furthermore comprises obtaining 120 an estimated location of an object by measuring 122 for the object a signal parameter induced by at least one access point of the set of access points and using a signal-space-to-physical-space mapping database for deriving an estimated location from the measured signal parameter. Such a database may comprise for example a signal-space-to-physical-space mapping recorded during an initial calibration procedure, e.g. by manual calibration or using any suitable calibration technique. Typical examples of algorithms for efficiently retrieving the information and the mapping database may for example be deterministic or probabilistic algorithms. Alternatively, the database may be an amended version of an initial database, e.g. amended in a previous recalibration step. The signal-space-to-physical-space mapping database may for example be an RF fingerprint database, a database of base station locations, or any other model which maps the signal space to the physical space. Measuring the signal parameter can for example be performed by reading out data from the object to be tracked. The object may be adapted for receiving data, i.e. a signal parameter or a parameter derived from the signal, based on signals induced, e.g. emitted, by one or more access points. The object may then be referred to as an active device. Alternatively measuring the signal parameter also may be performed by capturing data from the access points, whereby the access points may be adapted for detecting a beacon signal from the object to be tracked. The object to be tracked may then be referred to as a passive device.

Reading out the tracking device may be performed in any suitable way, embodiments of the present invention not being limited by a typical manner of reading out. The data may comprise information of the signal parameter such as for example signal strength, angle of emission, time of flight of signals, time difference, etc. In some embodiments the data may be a fingerprint such as an RF fingerprint.

The method also comprises determining 130 whether the obtained estimated location complies with the obtained location profile for the object. Non compliance with the obtained location profile may for example be that the estimated position of one or more tracked devices are suddenly located at a place near their usual location, but not at their usual location for a long period. The difference between the measured signal of these tracked devices and the signal in the mapping database at their usual location can then be used for recalibration of the mapping. Another example of non-compliance is the occurrence of a sudden change in the signal strength of one or more access points, which can for example be caused by a dynamic disturbance. Still another example of non-compliance is the occurrence of objects to be at unusual places, such as for example too close to a wall, tending to go through walls, many objects being in unusual rooms, etc. In one example, it may be determined whether the object is within a predetermined time interval, usually located at a recent usual location that is different from a classic usual location based on the location profile. The compliance may be evaluated based on a compliance score. Such a score may for example be based on the chance that an estimated position is taken by an object to be tracked according to the location profile, etc.

The method furthermore comprises, if the obtained estimated location does not comply with the location profile, dynamically adjusting 140 the mapping of the signal-space-to-physical-space to obtain an adjusted signal-space-to-physical-space mapping database. The latter may for example be based on a difference between the measured signal parameter and the signal parameter corresponding with the signal space for the location expected based on the location profile. The different steps may be repeated until a good agreement between estimated location and location profile is obtained. The latter may be evaluated by determining whether the difference between the estimated location and the expected location based on the location profile is smaller than a predetermined value. In other words, the method may comprise determining a new estimated location of the object using the adjusted signal-space-to-physical-space mapping. In some embodiments, additionally as an intermediate step, an optional evaluation can be made 150 whether the location profile is still accurate and, if it is considered this is not the case, optionally adjustment of the location profile 160 may be performed. Embodiments of the present invention result in an automated and/or automatic method for recalibrating a localization system, thus resulting in improved localization systems and results obtained therewith.

The recalibration procedure as described above may be performed continuously, at predetermined time intervals, when preselected objects to be tracked are located, etc. In some embodiments, the selection of the object to be tracked that is used for the recalibration process may be performed automatically based on different parameters, such as for example the behavior profile integrity, spatial distribution, processing power, etc.

Figure 2A:
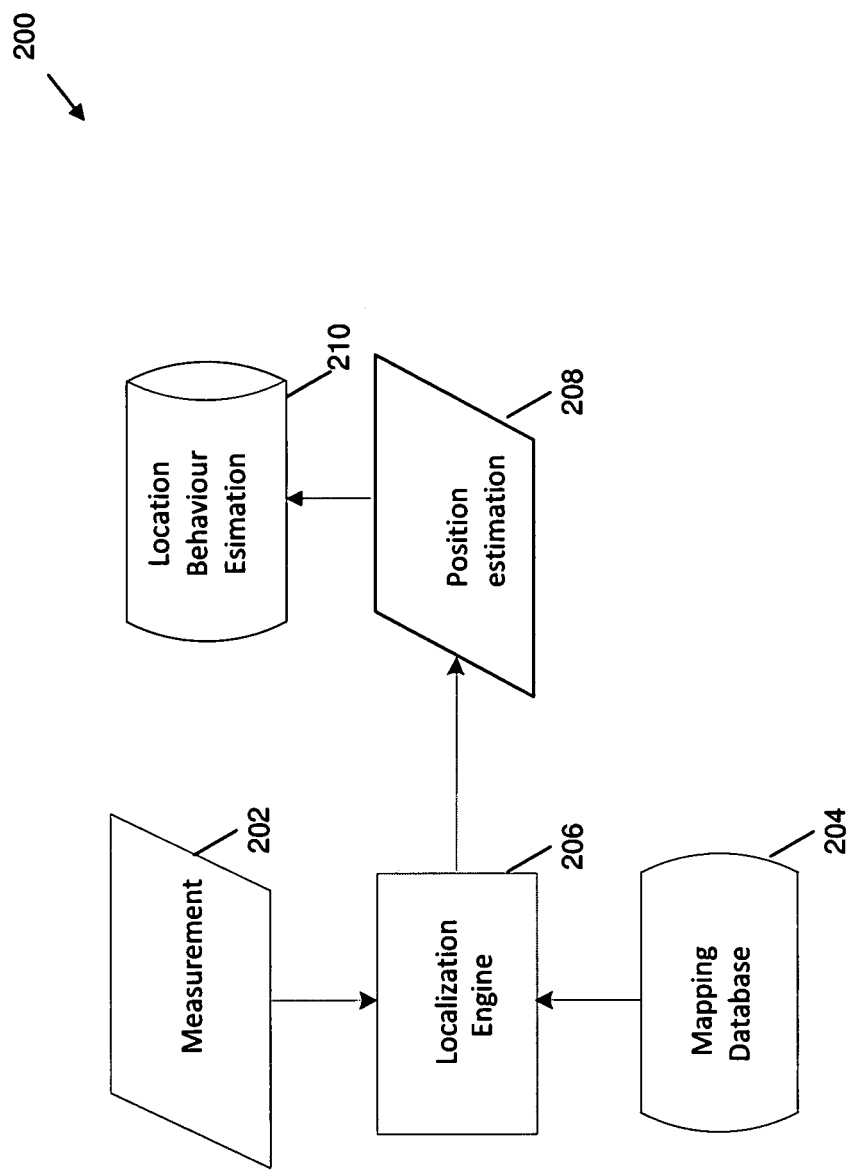
FIG. 2A and FIG. 2B show a schematic representation of an overall process for localizing an object and recalibrating the mapping of a signal space to physical space, the recalibrating being according to an embodiment of the present invention, whereby
Figure 2B:
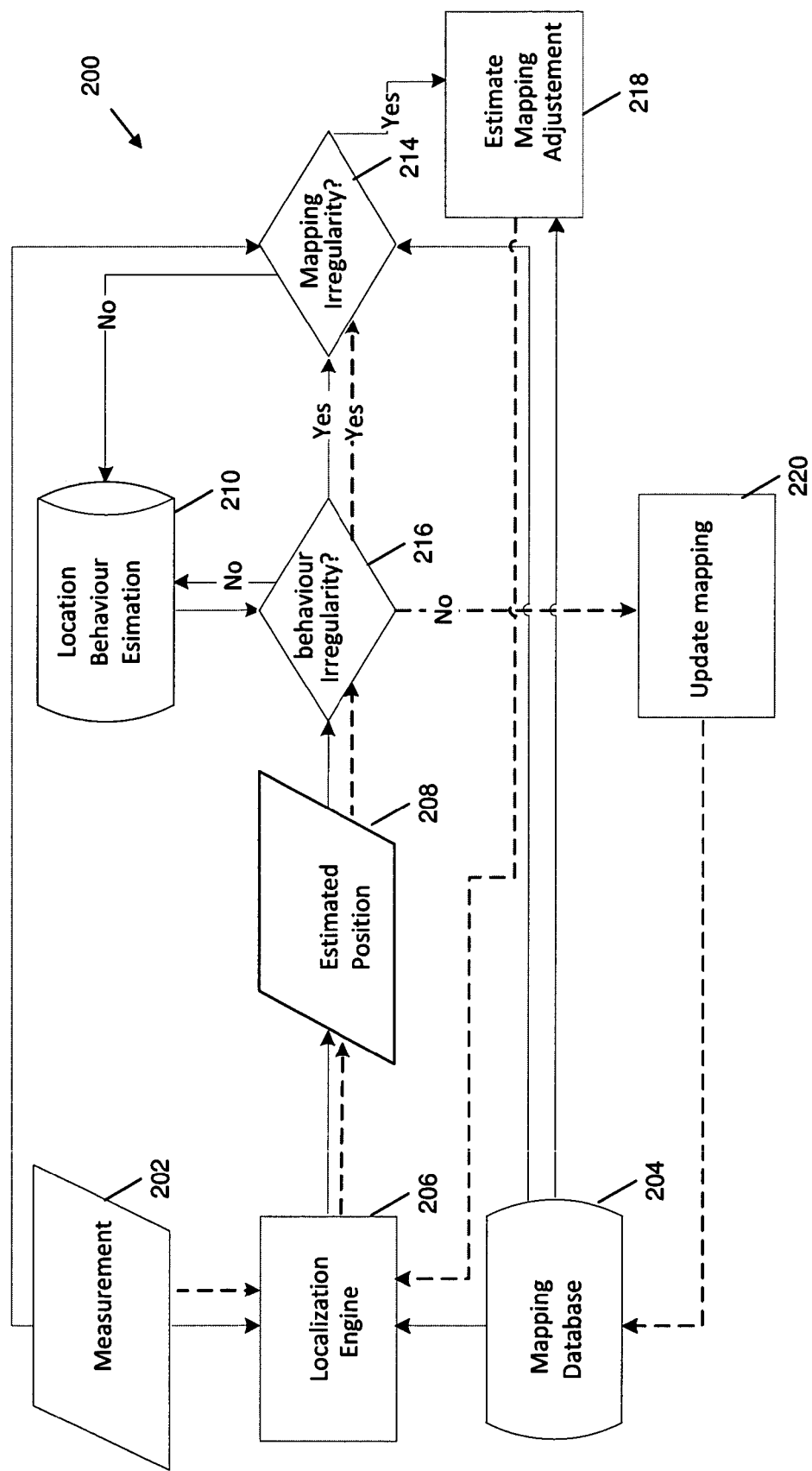

By way of illustration, embodiments of the present invention not being limited thereby, an exemplary method for recalibrating is described in combination with a localization method that can benefit therefrom, with reference to FIG. 2A and FIG. 2B. Standard as well as optional steps of the method for recalibrating are discussed as well as steps being part of the localization method.

The exemplary process 200 shown in FIG. 2A and FIG. 2B shows a method for localizing an object to be tracked in combination with a recalibration method whereby FIG. 2A illustrates an initialization process wherein a behavior profile can be constructed and whereby FIG. 2B illustrates a mapping process. Detection typically can be based on evaluating the signal parameter measured in an object to be tracked and induced by at least one but advantageously a set of access points.

In FIG. 2A an initialization process is illustrated wherein a behavior profile can be constructed. The initialization process may make use of the following steps:

Using an incoming measurement from the object to be tracked indicating a signal parameter induced by at least one access point and using the existing mapping database for signal-space-to-physical-space mapping, the localization engine estimates a position. Such position estimation may be performed by localization engine 206 based on a signal parameter measurement 202 and using the mapping database 204. The localization engine 206 provides as an output an estimated position 208.

The estimated position 208 is used for generating a location profile 210 of the object to be tracked. Such a location profile 210 may for example provide information regarding the dynamics in the position of the object to be tracked. One example of how to construct a location profile may be based on the probability that an object to be tracked d is on a location/during a time interval t. Such a probability can be estimated as:

$$P_d^t(l) = \frac{freq_d^t(l)}{\sum_l freq_d^t(l)} \qquad [1]$$

A location profile of a device for a period of time then can be described by dividing the period of time in η intervals and then is given by:

$$\text{Profile}_d = (P_d^{t0}, P_d^{t1}, \ldots, P_d^{tn}) \qquad [2]$$

The location profile typically is built up by tracking an object over a long time, and thus can be previously recorded or can be a continuously updated datasource.

In FIG. 2B, the full arrows in the exemplary overall process describe one possible suggestion for a regular localization and an irregularity detection process. Similar as for the setting up of a location behavior profile, the method comprises using an incoming measurement from the object to be tracked indicating a signal parameter induced by at least one access point and using the existing mapping database for signal-space-to-physical-space mapping for estimating a position Such position estimation may be performed by localization engine 206 based on a signal parameter measurement 202 and using the mapping database 204. The localization engine 206 provides as an output an estimated position 208.

The process 200 indicated in FIG. 2B furthermore comprises comparing the estimated position 208 with the location profile 210 for detecting whether there is a location irregularity. The latter is indicated by decision step 216 in the process 200. One example of detecting a location irregularity is by statistically analyzing whether the estimated position is irregular. Taking into account the location profile and the probability that the object is on a certain position, in one example an irregularity score can be defined $$\text{BehaviourIrregularityScore}(P_d^t) = -\log(P_d^t(l)) \qquad [3]$$

$$\text{BehaviourIrregularityScore}(P_d^t) > \text{BehaviourIrregularityThreshold}_d^t \qquad [4]$$

and if the BehaviourIrregularityScore exceeds a predetermined threshold, the location is treated as a possible irregularity. The threshold can depend on the probability distribution and can for example be initialized as $$BehaviourIrregularityThreshold_d^l = -\log\left(\frac{\max P_d^l(l)}{2}\right). \quad [5]$$

If the derived estimated position 208 is not corresponding with the location profile 210 and it is decided in step 216 that this relates to a behavior irregularity, it will, according to the present example, be processed by a mapping irregularity process 214. Alternatively, it may be considered that the location profile should be adapted. The latter may be concluded because an object to be tracked has developed a new behavior, whereby e.g. new locations are frequented, which are not yet present in the location profile, but which are valid estimated positions.

The mapping irregularity process 214 checks if the incongruity can be originated by a mapping irregularity based on a comparison between the recorded measurement and the mapping database. If a possible mapping irregularity is detected, an adjustment is estimated 218 and applied to the mapping to be used in subsequent localization steps. Such an adjustment may be made on a provisional base, and may be re-evaluated when further position estimations are evaluated. In one example, the estimated position is compared with the entry corresponding with the most likely location near the estimated position, this corresponds with a local maximum in the location profile. The latter is referred to as the expected position based on the location profile, and can be expressed as $$\underset{l}{\operatorname{argmax}} P_d(l \mid l_e) \quad [6]$$

The sample Pearson correlation coefficient of the set (mapping database entry, measurement) can be calculated, sample Pearson correlation coefficient:

$$r = \frac{1}{n-1} \sum_{i=1}^{n} \left(\frac{X_i - \overline{X}}{s_X}\right)\left(\frac{Y_i - \overline{Y}}{s_Y}\right)$$

with
  standard score:

$$\left(\frac{X_i - \overline{X}}{s_X}\right) \quad [7]$$

sample mean: $\overline{X}$
  sample standard deviation: $s_X$
and if this coefficient is above a correlation threshold $$r > CorrelationThreshold \quad [8]$$

the measurement will be further examined. Otherwise the measurement will be neglected and the new location will be added to the location profile.

Figure 3:
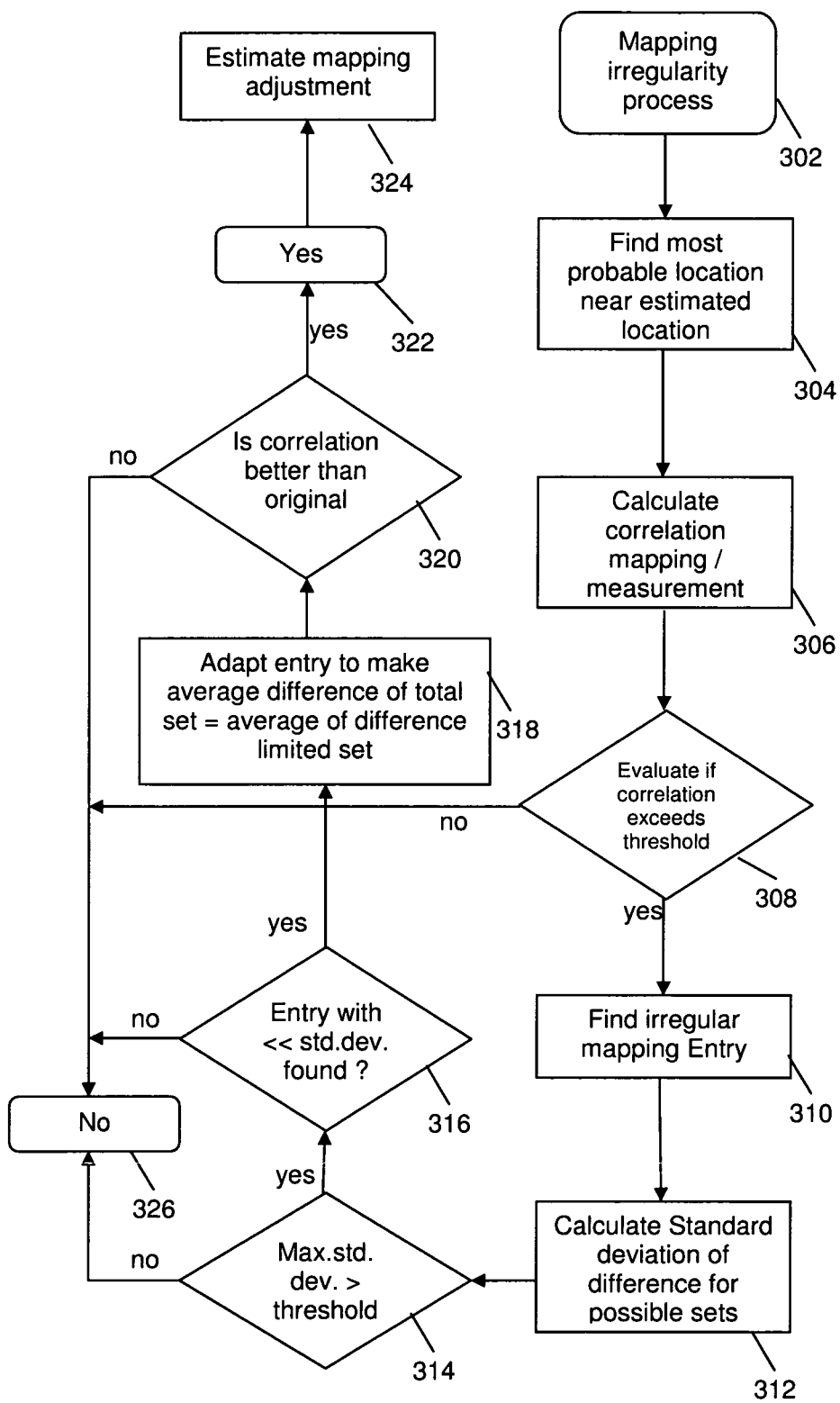
FIG. 3 illustrates a schematic representation of a mapping irregularity procedure, as can be used in an embodiment of the present invention.

One possible evaluation of a mapping irregularity process according to the exemplary process 200 can be as shown in FIG. 3. The mapping irregularity 302 is started with a step of finding 304 the most probable location in the location profile 210 that is near the estimated position 208. A correlation between the mapping and the measurement is determined in step 306 and evaluation is made whether or not the correlation is above a certain threshold in step 308. If this is not the case, the process is ended in step 326. If the correlation is above a certain threshold, a mapping entry is searched which lowers the standard deviation of the differences between mapping and measurement to the utmost when the entry is removed from the set. The latter is performed by finding an irregular mapping entry 310, calculating a standard deviation for the difference for the possible sets 312 and evaluating whether a maximum standard deviation is above a threshold 314. If not the method is stopped. If the standard deviation is above the threshold, it is evaluated whether an entry with a substantially smaller standard deviation can be identified in step 316. If this is the case, the entry is adapted 318 to a limited set in order to increase 320 the correlation between the adapted mapping set and the measurement. If the correlation is better than the original correlation according to step 322, a mapping adjustment is thus estimated.

The process 200 described in FIG. 2B also describes an optional feedback loop for finding a realistic adjustment. This loop is described by the process indicated by the dashed arrows. Starting from the estimated adjustment 218 and based on the current measurement 202, a new estimated position 208 is determined in the localization engine 206 using the adjusted mapping info. This new estimated position is again checked with the location profile 210 to see if the adjustment initiated the foreseen correction. If there is still an irregularity, the loop is repeated. The system may be programmed such that the loop is repeated until the distance between the estimated position and the expected position is smaller than a predetermined value and/or until a predetermined number of loops has been executed. If there is no irregularity anymore, the adjustment is considered correct and the update is processed to change the mapping database in step 220.

In the process 200 shown in FIG. 2B, as well as in other embodiments according to the present invention, the process can for example only select the most feasible objects to be tracked for the auto recalibration depending on their location profile or spatial configuration. In another example the system may adapt the mapping database only after a predetermined number of irregularities have been identified in subsequent steps. In still another example, the system may adapt the mapping database only after the same irregularities have been detected by at least a predetermined number of access points.

As indicated above, embodiments of the present invention are not limited by the specific way in which an estimated location of an object is obtained by measuring a signal parameter induced by at least one access point. In a first particular embodiment the object to be tracked determines the signal parameter based on detection of a signal emitted by the access points. The signal parameter values may be sent to a processor or server by the object to be tracked. In another embodiment the object to be tracked emits a beacon signal which is detected by the access points. Based on this detection, the access points evaluate the strength of the object to be tracked and the obtained data may be sent to a processor or server.

In one embodiment the signal strength is used directly in combination with angle determination. The signal-space-to-physical-space mapping describes the position of access points and provides a description on how signal weakening corresponds with the distance and optionally with the presence of objects creating attenuation and weakening of the signal on the path way.

Figure 4A:
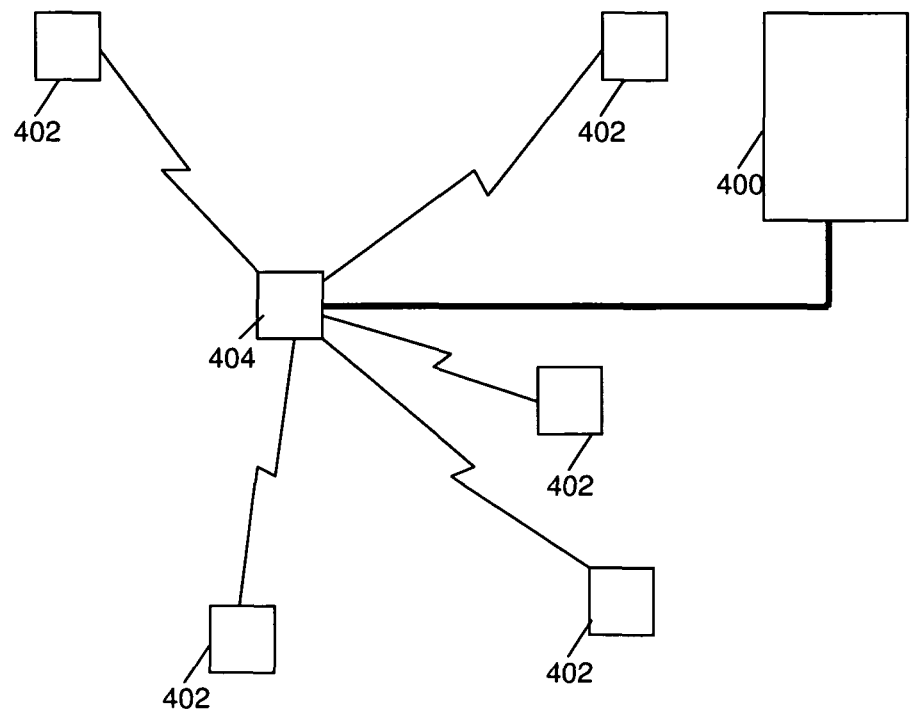
FIG. 4A shows an example of a localization system that can make use of a device for adjusting the mapping of a signal space to physical space of a set of access points, according to an embodiment of the present invention.
Figure 4B:
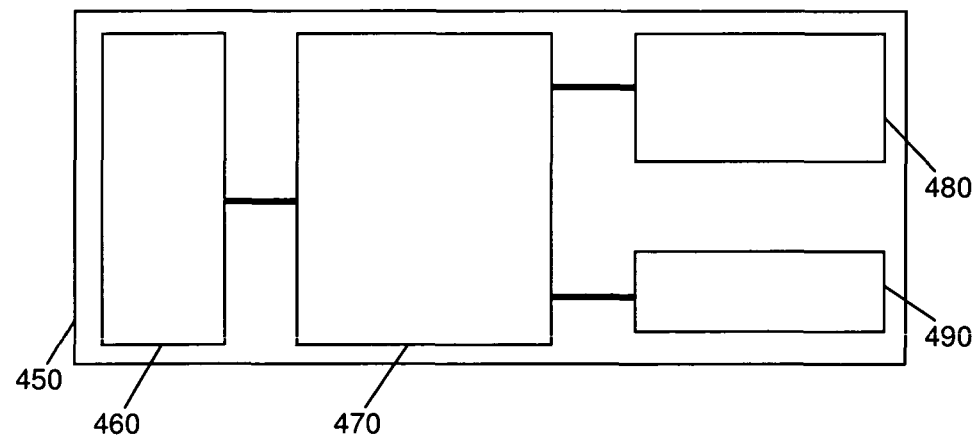
FIG. 4B shows an example of a device for dynamically adjusting the mapping of a signal space to physical space of a set of access points, according to an embodiment of the present invention.

In a second aspect, the present invention relates to a device for dynamically altering a signal-space-to-physical-space mapping database of a set of access points for use in localizing an object. The device may be part of a localization system or may be a separate device operating in combination therewith. It may be provided as a processor or controller for and/or in a localization system or may be provided as an add-on to a controller of a localization system. The device may be used for and/or in a localization system as shown by way of example in FIG. 4A, illustrating a localization system 400 for localizing an object 404 using a set of access points 402. The access points 402 may be part of the localization system 400 or the localization system 400 may be used in combination with a set of access points 402. The access points 402 may for example be emitters as described above, emitting radiation for which the signal parameter is to be measured by the object 404. Localization of the object to be tracked can be determining based on the signal parameter values detected in the object with respect to the set of access points. The number of access points may be at least one, and is advantageously adapted such that a good coverage of the area of interest is obtained. Localization of the object to be tracked can be performed by reading the signal parameter received at the object to be tracked. This information typically is processed in a processor of the localization system 400, receiving the information from the object to be tracked, e.g. in a wireless manner. A processor typically may evaluate the received or measured signal parameter values in the object to be tracked using a signal-space-to-physical-space mapping, i.e. for example as a fingerprint of the access points resulting in a position determination. As indicated above, the device according to embodiments of the present invention may be part of such a localization system or may be used in combination therewith. The device for dynamically altering the mapping, e.g. to cope with a change in environment or setting through which the signal path of at least one of the access points to the object is altered, comprises an input means for receiving a location profile for the object and for receiving a measured signal parameter induced by at least one access point from the set of access points. Receiving a measured signal parameter value induced by at least one access point may be performed similarly as for localization of the object or may be obtained during localization. Receiving a location profile may be based on previously measured locations of the objects or may be put in by a user. It thus can comprise a data input port and/or a measurement system for actually determining the input. Advantageously, the location profile may be based on previously measured locations. The device furthermore comprises a processor for deriving from the signal parameter an estimated location of an object using the signal-space-to-physical-space mapping database. This part of the processor may be similar as the processor for localizing or this part may be common with the localization component of the localization system. According to embodiments of the present invention, the processor furthermore is programmed for determining whether the obtained estimated location complies with the obtained location profile for the object and for, if the obtained estimated location does not comply with the location profile, dynamically adjusting the mapping database to obtain an adjusted signal-space-to-physical-space mapping database based on a difference between the measured signal parameter and the signal parameter corresponding with the signal space for the location expected based on the location profile. The device furthermore may comprise components, implemented as part of the processor or as separate components, such components being adapted for performing the functionality of one or more of the features as described in the method embodiments set out above. By way of illustration, embodiments of the present invention not being limited thereto, an example of a device 450 for adjusting the mapping is shown in FIG. 4B, the device 450 comprising an input means 460 and a processor 470 as described above. Typically also a memory 480 for storing and retrieving data and an output means 490 for reporting data regarding the recalibration may be present. The device may be adapted for performing distributed processing, i.e. part of the processing may be performed at a location distant from the location where the object to be tracked is present or distant from the location where the localization processing is performed.

The present invention therefore also encompasses a device having an input means for providing signal parameter information regarding the signal parameter measured in an object to be tracked and a receiving means for receiving localization information obtained through a localization system comprising a device for adjusting the mapping as described above. The device according to embodiments of the present invention may be implemented as software on a computing device or may be implemented as hardware. It may be automatic and/or automated. The processing in the device may be based on a predetermined algorithm, a set of instructions, a neural network, etc. Further advantages may be as set out for other embodiments of the present invention.

In one aspect, the device for adjusting as described in the second aspect, may be provided as an application, which can be loaded in a processor of an existing localization system as an upgrade or which can be provided on a new localization system. It is an advantage of embodiments according to the present invention that a system can be upgraded to a localization system with automated recalibration function, resulting in more accurate localization of objects to be tracked. Such an application may be provided in different ways, i.e. for example on a carrier or over a network, as will be discussed further below. In one aspect, the device for adjusting as described in the second aspect, may be provided as additional module to be incorporated in a localization system. According to one aspect, embodiments of the present invention also relate to a method of upgrading a localization system, the method comprising installing an application as described above on the processor of the localization system or installing a processing module as described above on the localization system.

Figure 5:
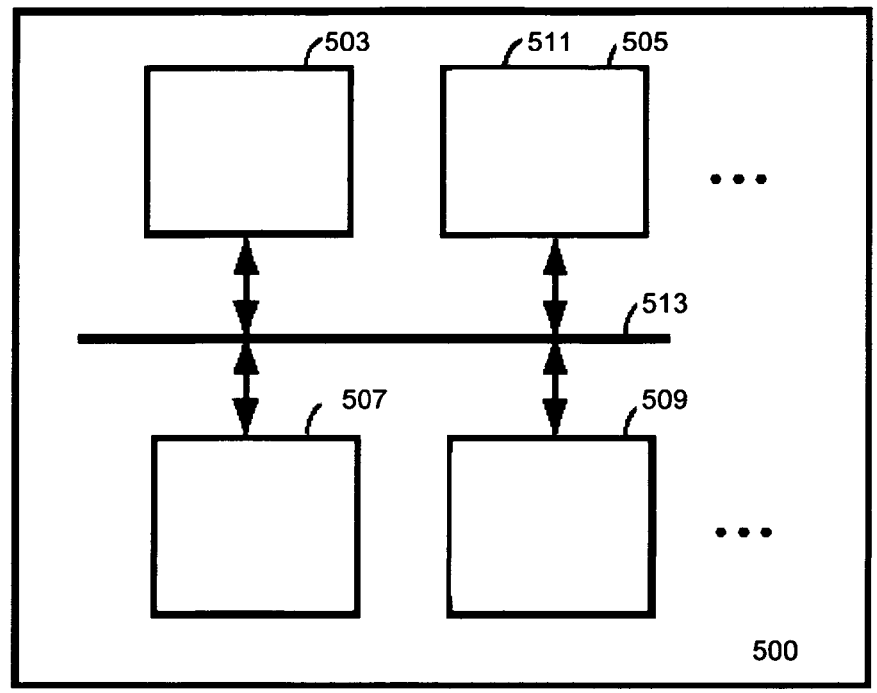
FIG. 5 illustrates a computing means that may be used for performing a method according to an embodiment of the present invention.

As already mentioned above, the above described method embodiments for dynamically altering the mapping of a signal space of a set of access points to physical space access points for localizing an object may be at least partly implemented in a processing system 500 such as shown in FIG. 5. Also the systems as described above may be implemented as processing system, may be part thereof or may comprise such system. FIG. 5 shows one configuration of processing system 500 that includes at least one programmable processor 503 coupled to a memory subsystem 505 that includes at least one form of memory, e.g., RAM, ROM, and so forth. It is to be noted that the processor 503 or processors may be a general purpose, or a special purpose processor, and may be for inclusion in a device, e.g., a chip that has other components that perform other functions. Processing may be performed in a distributed processing manner or may be performed at a single processor. Thus, one or more aspects of the present invention can be implemented in digital electronic circuitry, or in computer hardware, firmware, software, or in combinations of them. The different steps may be computer-implemented steps. The processing system may include a storage subsystem 507 that has at least one disk drive and/or CD-ROM drive and/or DVD drive. In some implementations, a display system, a keyboard, and a pointing device may be included as part of a user interface subsystem 509 to provide for a user to manually input information. Ports for inputting and outputting data also may be included. More elements such as network connections, interfaces to various devices, and so forth, may be included, but are not illustrated in FIG. 5. The memory of the memory subsystem 505 may at some time hold part or all (in either case shown as 501) of a set of instructions that when executed on the processing system 500 implement the steps of the method embodiments described herein. A bus 513 may be provided for connecting the components. Thus, while a general processing system 500 such as shown in FIG. 5 is prior art, a system that includes the instructions to implement aspects of the methods for recalibrating a localization system by adjusting the mapping of a signal space to physical space of access points for localizing an object, and therefore FIG. 5 is not labelled as prior art.

The present invention also includes a computer program product which provides the functionality of any of the methods according to the present invention when executed on a computing device. Such a computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

In some embodiments, the computer program products or systems as described above may be web applications, also referred to as web services, i.e. computer program applications that can be performed and/or provided using a network, such a for example a LAN, a WAN or the Internet. Part of the localization system, e.g. the access points and optionally also part of the processor, typically may be located at a place distant from the place where at least part of the processing for adjusting the mapping is performed. The mapping adjusting may be provided as a web service, whereby a localization system is updated over a network.

Figure 6:
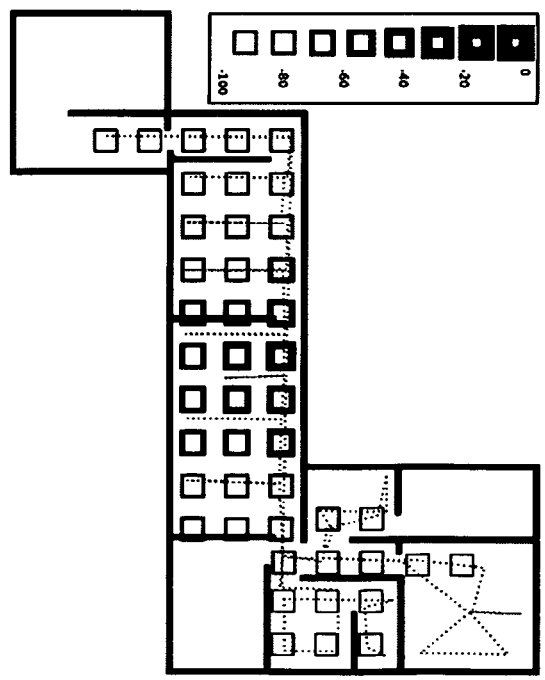
FIG. 6 illustrates a graphical representation of a fingerprint for a single access point as can be used in methods and systems according to embodiments of the present invention.
Figure 7:
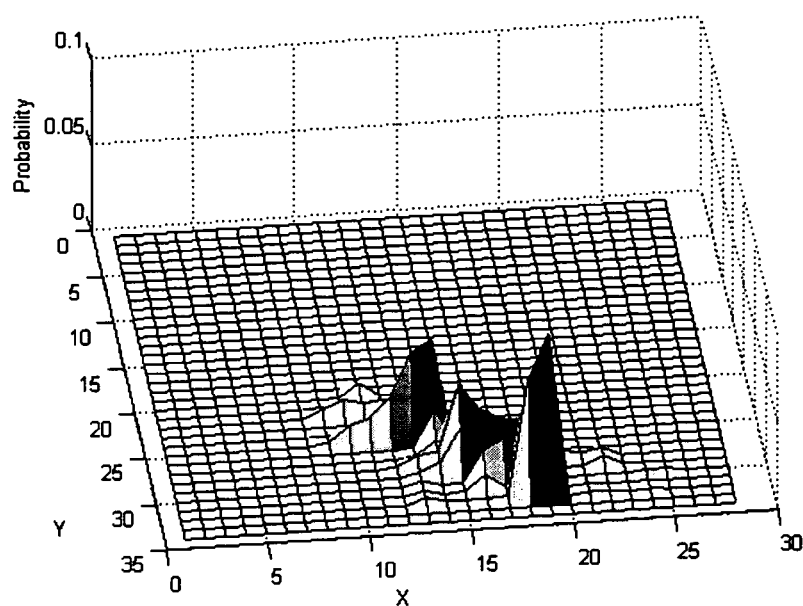
FIG. 7 illustrates an example of a location profile as can be used according to an embodiment of the present invention.

By way of illustration, some experimental results for use of a method according to embodiments fo the present invention are shown in FIG. 6 to FIG. 9. FIG. 6 illustrates a graphical representation of a fingerprint for a single access point as can be used in methods and systems according to embodiments of the present invention. The drawing indicates the signal strength h received in an object to be tracked and emitted in the access point. FIG. 7 illustrates an example of a location profile where X and Y are coordinates of an environment, the graph thus indicating the probability that an object will reside at a position (X,Y), based on the residence of the object at that position during the construction of the location profile.

Figure 8:
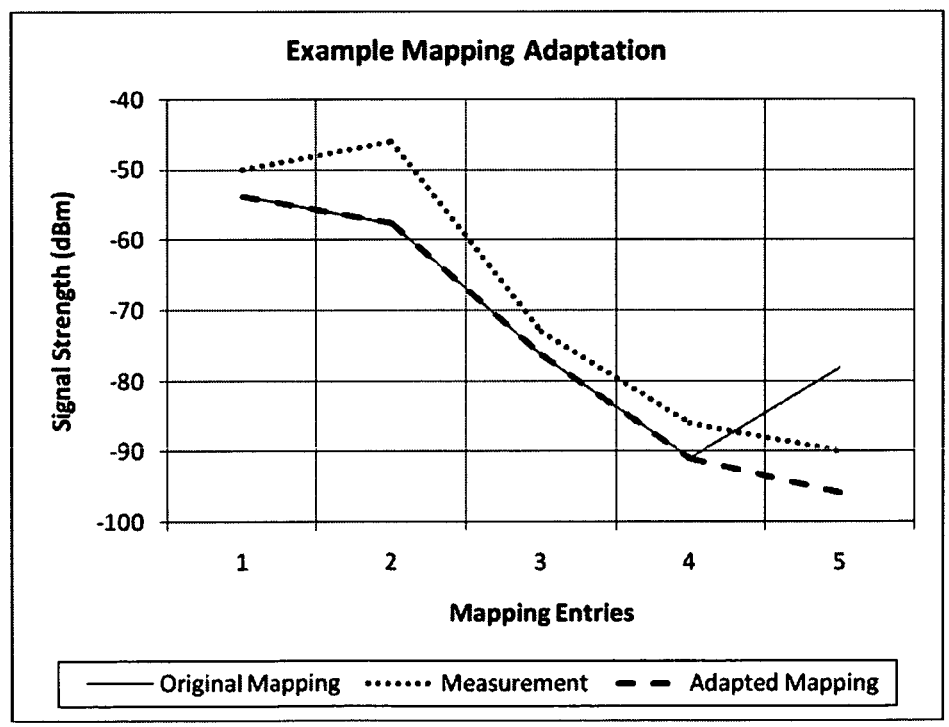
FIG. 8 illustrates an example of a mapping adaptation using a method according to an embodiment of the present invention.

FIG. 8 illustrates an example of a mapping adaptation indicating the signal parameter as function of the mapping entries, whereby the full line indicates the original mapping, the dotted line indicates the measurement, and the dashed line indicates the adapted mapping. It can be seen that the adapted mapping provides a better mapping of the signal parameter than the original mapping.

Figure 9:
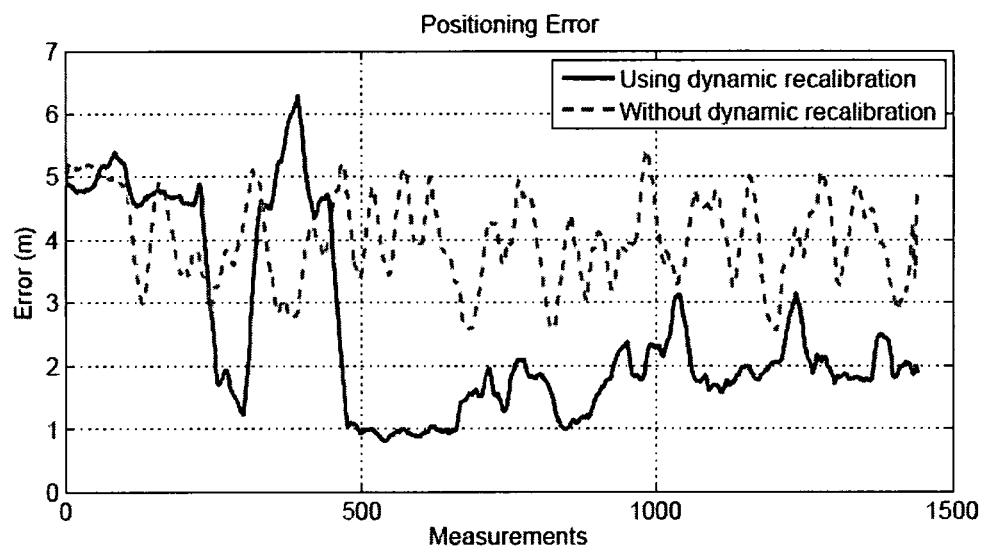
FIG. 9 illustrates an experimental result of a tracking for both a method using dynamic recalibration according to an embodiment of the present invention as well as for a method without recalibration.

FIG. 9 illustrates an experimental result of a tracking for both a method using dynamic recalibration according to an embodiment of the present invention as well as for a method without recalibration. The error (expressed in m) as function of the measurement number for subsequent measurements (i.e. equivalent with the measurement time), is shown. It can be seen that the method with dynamic recalibration provides far better results than the method without dynamic recalibration.

Figure 10:
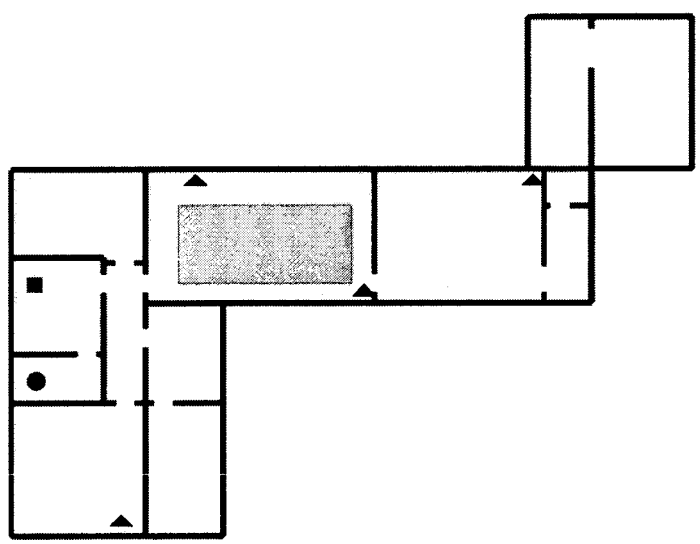
FIG. 10 illustrates an experimental setup for dynamic recalibration in an office environment, illustrating features and advantages of embodiments according to the present invention.
Figure 11:
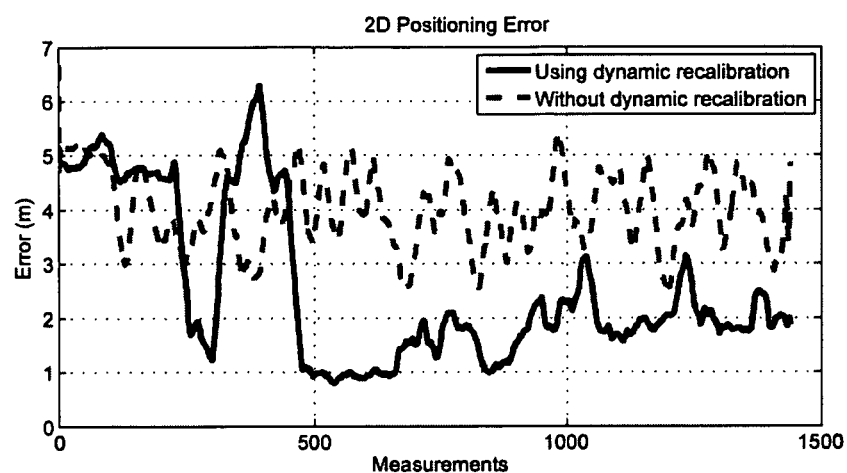
FIG. 11 illustrates the location error using a method for dynamic recalibration according to an embodiment of the present invention for a setup as shown in FIG. 10.

By way of illustration also additional experimental examples are discussed below. In a first additional example, the effect of recalibration on the location estimation is illustrated. The experiment was done in an office environment as shown in FIG. 10. One person working on his laptop was used as test object to measure the localization error, this person being indicated with the circle in FIG. 10. Another person was working on a laptop on his desk in the neighbouring office. This laptop was used for recalibration and is indicated by the small rectangle. The access points are indicated by the triangles. Both laptops continuously sent data to the localization engine. However, the engine was not able to create a consistent location behaviour profile for the first user (indicated with the circle) yet. This means that only the measurements of the second user could be used to initiate mapping adaptations. The large rectangle indicates the area which was entered by about 20 persons. These persons influenced the received signal strength from the three access points in that area heavily. After the initialization process, the recalibration process could adapt the fingerprint database. This resulted in an improved location estimation for the first user, as can be seen from FIG. 11, indicating that using dynamic recalibration the average 2D positioning error is significantly lower than without dynamic recalibration.

Figure 12:
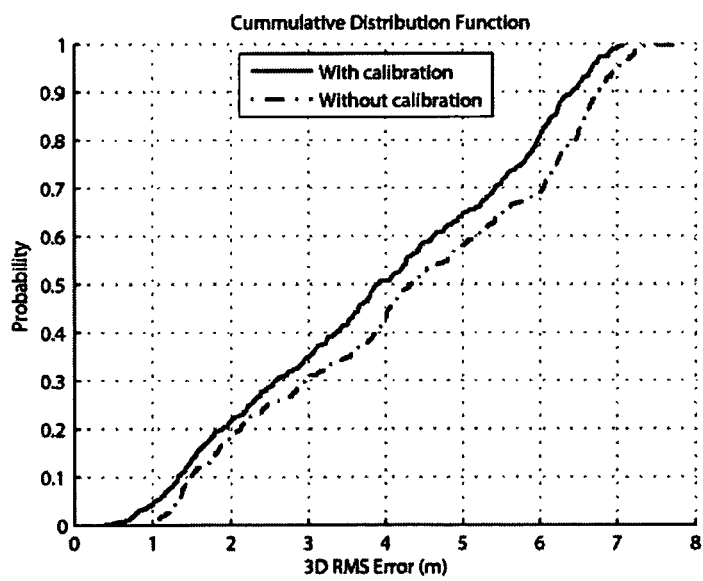
FIG. 12 illustrates the location error with dynamica recalibration in a home environment, illustrating features and advantages of embodiments according to the present invention.
Figure 13:
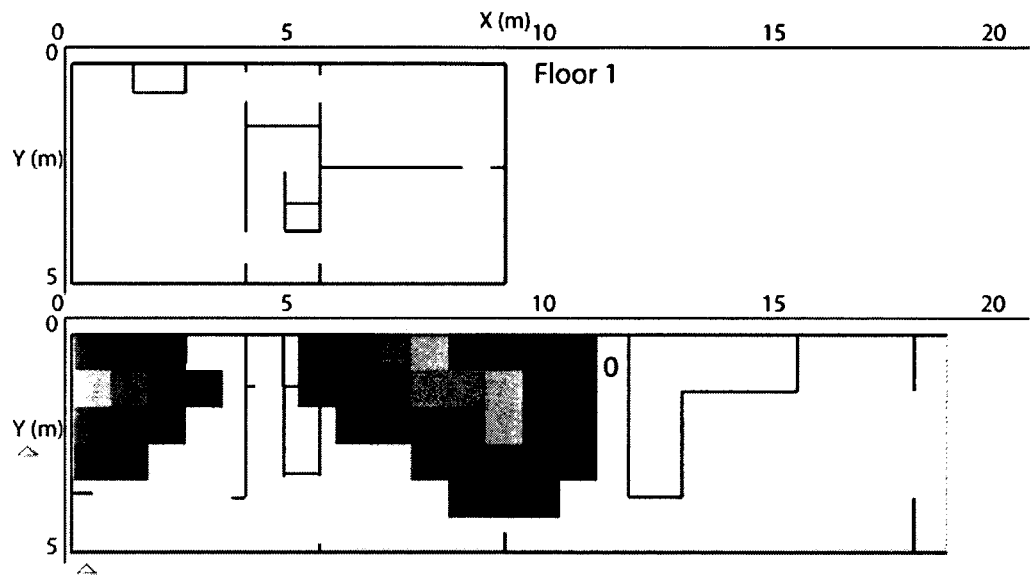
FIG. 13 illustrates the estimated location behaviour profile of a test object, illustrating features and advantages of embodiments of the present invention.

In a second additional experiment, localization was performed in a home environment. The measurements were done while working on a laptop in the room in the centre of the house. Two localization engines were running simultaneously, one with automatic recalibration, one without automatic recalibration. The improvement is shown in the cumulative distribution function in FIG. 12. FIG. 13 illustrates the estimated location behaviour profile of the test object.

Figure 14:
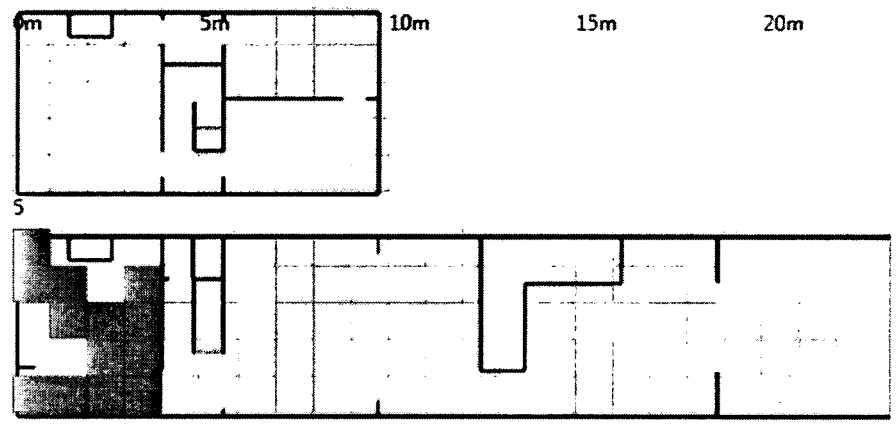
FIG. 14 illustrates a fingerprint adaptation of a newly added access point when using a method according to an embodiment of the present invention for an experimental setup.
Figure 15:
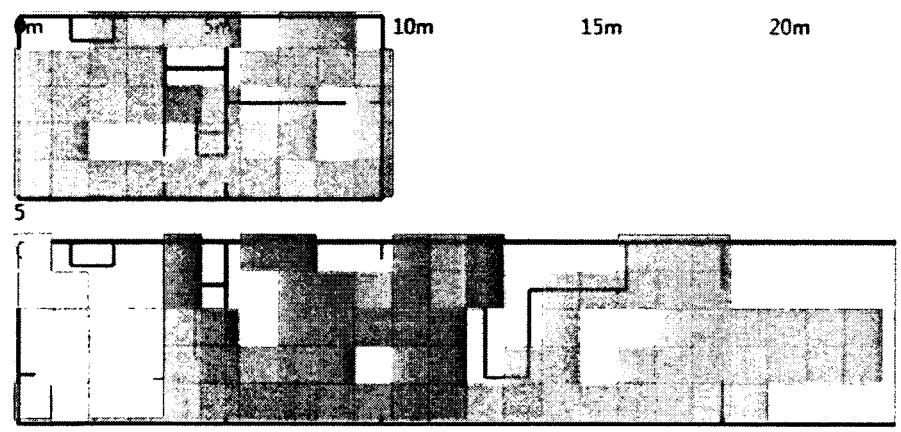
FIG. 15 illustrates a fingerprint adaptation of a removed access point when using a method according to an embodiment of the present invention for an experimental setup.

In a third additional experiment, the same setup as for the second experiment was used, whereby, the only access point that was present inside the testing home environment was removed and replaced by another access point. In the left room on the ground floor the clients could still detect two very weak signals of access points of neighbours. In the rest of the environment only one access point of a neighbour was detected. In FIG. 14 the initial adaptation is shown for the fingerprint of this newly added access point. An initial adaptation estimates a signal strength of −56 dBm for this access point in the first room. This adaptation will propagate to the other rooms once the user moves. The opposite adaptation is proposed by the automatic recalibration process for the removed access point. This is shown in FIG. 15. Here the process detects the removal of an access point because of measurements of a user in the first room. This adaptation will again propagate to the other rooms.

The invention claimed is:

1. A method for dynamically altering a signal-space-to-physical-space mapping database of a set of access points for use in localizing of an object, comprising:
   obtaining a location profile for the object, the location profile comprising an object's location pattern and an object's location behaviour, and corresponding with a set of probabilities where an object to be tracked is positioned at a certain position during a given time interval, wherein the location behaviour of the object to be tracked is based on different behaviours during a given day or during a given week,
   obtaining an estimated location of the object by measuring a signal parameter induced by at least one access point and using the signal-space-to-physical-space mapping database to derive an estimated location from the measured signal parameter,
   determining whether the obtained estimated location complies with the obtained location profile including the location behaviour for the object by determining whether or not the object is, within a predetermined time interval, located at a location different from a location based on the location profile including the location behaviour, and
   if the obtained estimated location does not comply with the location profile including the location behaviour, dynamically adjusting the mapping database to obtain an adjusted signal-space-to-physical-space mapping database.

2. The method according to claim 1, wherein obtaining a location profile for the object comprises obtaining a location profile for the object based on a plurality of localization determinations of the object using the signal-space-to-physical-space mapping database.

3. The method according to claim 1, the method comprising determining a new estimated location of the object using said adjusted signal-space-to-physical-space mapping database.

4. The method according to claim 1, including, before dynamically adjusting, evaluating the location profile.

5. The method according to claim 1, including determining whether or not a change in a signal parameter for a plurality of emitters and/or receivers occurs.

6. A method according to claim 1, wherein dynamically adjusting comprises determining the adjusted signal space to physical space mapping database based on the difference between the measured signal parameter and the signal parameter corresponding with the signal space for the location expected based on the location profile.

7. The method according to claim 1, wherein dynamically adjusting the mapping to obtain an adjusted signal-space-to-physical-space mapping database comprises determining the adjusted signal-space-to-physical-space mapping database based on positions of the object that are not likely.

8. The method according to claim 1, wherein the signal-space-to-physical-space mapping database is any of an RF fingerprint database or a database of base station locations.

9. The method according to claim 1, wherein the set of access points is a selected set of access points, selected depending on their spatial configuration.

10. The method according to claim 1, wherein said dynamically adjusting is performed if the expected location does not comply with the location profile for at least a predetermined number of times.

11. The method according to claim 1, wherein said dynamically adjusting is performed if a difference between the measured signal parameter and the signal parameter corresponding with the signal space for the location expected based on the location profile is detected for at least a predetermined number of access points.

12. A method according to claim 1, the method being implemented as a computer program product.

13. The method according to claim 3, including repeating said determining whether an obtained estimated location complies with the obtained location profile for the object, said dynamically adjusting and said determining a new estimated location being carried out until the obtained estimated location complies with the obtained location profile.

14. The method according to claim 4, wherein the location profile is updated depending on said evaluating.

15. A device for dynamically altering a signal-space-to-physical-space mapping database of a set of access points for use in localizing an object, comprising:
   an input arrangement configured to receive a location profile for the object and to receive a measured signal parameter induced by at least one access point, the location profile comprising an object's location pattern and an object's behaviour, and corresponding with a set of probabilities where an object to be tracked is positioned at a certain position during a given time interval, wherein the location behaviour of the object to be tracked is based on different behaviours during a given day or during a given week,
   a processor programmed to derive from the signal parameter an estimated location of an object using the signal-space-to-physical-space mapping database,
   the processor furthermore being programmed to determine whether the obtained estimated location complies with the obtained location profile including behaviour for the object by determining whether or not the object is, within a predetermined time interval, located at a location different from a location based on the location profile including behaviour, and
   if the obtained estimated location does not comply with the location profile including behaviour, to dynamically adjust the mapping database to obtain an adjusted signal-space-to-physical-space mapping database.

16. The device according to claim 15, wherein the device comprises a controller for use in a system for localizing an object.

17. The device according to claim 15 or 16, the device being implemented as a computer program product that, when executed on a computer, performs dynamically altering the mapping of either or both a signal space of a set of emitters and receivers for localizing an object.

18. A method for upgrading a localization system, the method comprising installing on a processor of the localization system a non-transitory computer program product containing computer instructions stored therein for causing a computer processor to perform for executing a method that dynamically alters a signal-space-to-physical-space mapping database of a set of access points for use in localizing of an object, the method comprising:

obtaining a location profile for the object, the location profile comprising an object's location pattern and an object's behaviour, and corresponding with a set of probabilities where an object to be tracked is positioned at a certain position during a given time interval, wherein the location behaviour of the object to be tracked is based on different behaviours during a given day or during a given week, obtaining an estimated location of the object by measuring a signal parameter induced by at least one access point and using the signal-space-to-physical-space mapping database for deriving an estimated location from the measured signal parameter, determining whether the obtained estimated location complies with the obtained location profile including behaviour for the object by determining whether or not the object is, within a predetermined time interval, located at a location different from a location based on the location profile including behaviour, and if the obtained estimated location does not comply with the location profile including behaviour, dynamically adjusting the mapping database to obtain an adjusted signal-space-to-physical-space mapping database.

* * * * *